May 11, 1943.  W. A. RIDDELL  2,319,086
PHOTOFLASH SYNCHRONIZING APPARATUS
Filed Aug. 7, 1942
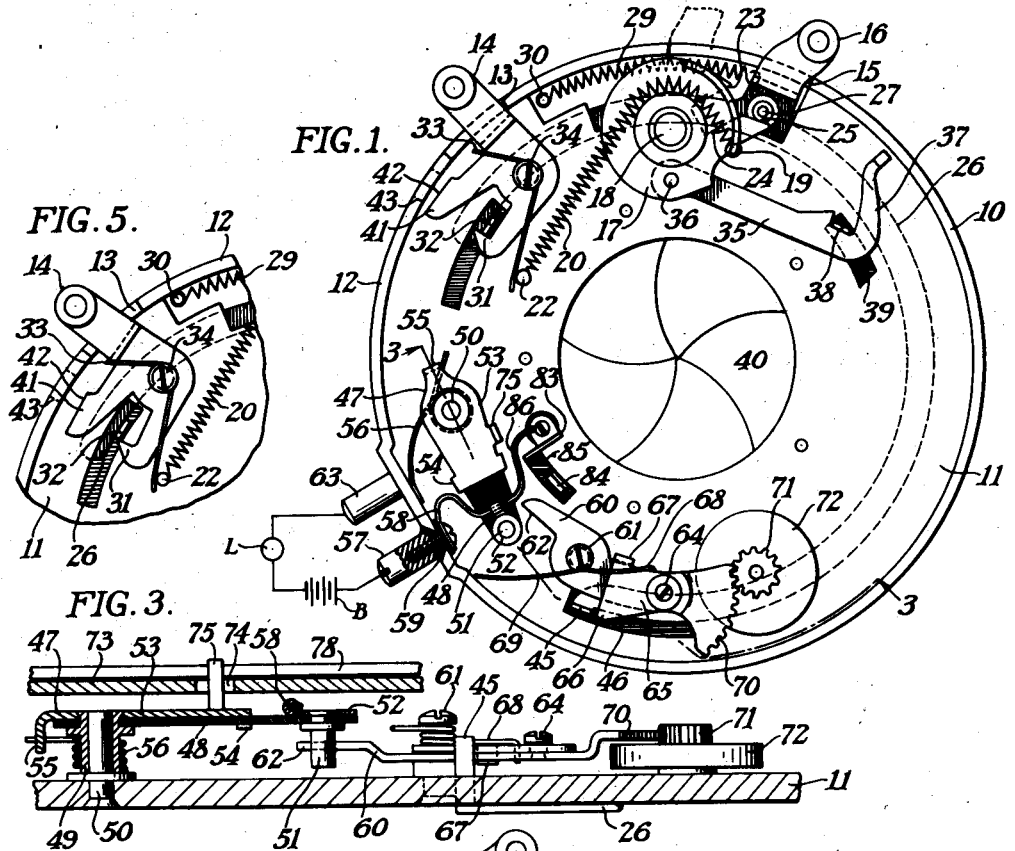
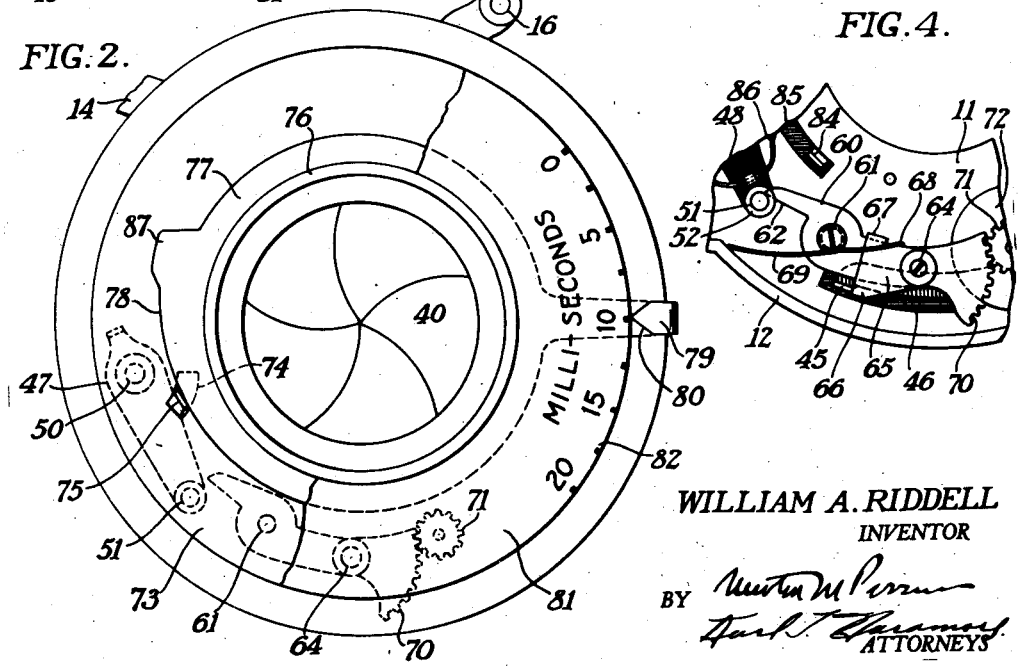
WILLIAM A. RIDDELL
INVENTOR
BY
ATTORNEYS Patented May 11, 1943

2,319,086

UNITED STATES PATENT OFFICE 2,319,086

PHOTOFLASH SYNCHRONIZING APPARATUS

William A. Riddell, Rochester, N. Y., assignor to Eastman Kodak Company, Rochester, N. Y., a corporation of New Jersey Application August 7, 1942, Serial No. 453,961

11 Claims. (Cl. 67—29)

The present invention relates to photography, and particularly to a photoflash synchronizing device suitable for synchronizing the flashing of a lamp and the opening of a camera shutter when instantaneous exposures at high shutter speeds are desired.

More specifically, the present invention relates to an improvement in the synchronizing device disclosed in U. S. Patent 2,256,354, issued to me September 16, 1941.

As is fully set forth in my above-noted patent, flash lamps which are used in photography generally include a characteristic "lag," as the time to reach the peak of illumination after the circuit to the filament thereof is closed is commonly known as, which must be taken into account in order to synchronize the flashing of the lamp with the opening of a shutter. In flash synchronizing apparatus the lamp "lag" is generally accounted for by closing the lamp circuit a given time prior to the actual release of the camera shutter so that the shutter when fully opened will include the peak of illumination of the lamp. It has been found that the most satisfactory and efficient manner of accurately controlling the timed relation of these two operations is to have the lamp circuit controlled through movement of the mechanism of the shutter itself. This is conveniently accomplished with the structure shown in my above-noted patent wherein the shutter setting lever, which cocks and holds the shutter master member in a set position, closes the lamp circuit as well as releases the master member, and the proper time interval between the two operations is provided for by a lost-motion connection between the setting lever and master member which permits the relative movement of the two in both directions of movement of the setting member.

As the result of much research work on flash lamps recently there are now available lamps the "lags" of which vary all the way from approximately 4 milliseconds to 20 milliseconds. It will be obvious that a flash synchronizer suitable for use with lamps having "lags" over this range must be provided with some suitable means for readily adjusting the same to account for different time delays between the closing of the lamp switch and the release of the shutter. Furthermore, I have found that in order to obtain the maximum delay between the closing of the lamp circuit and the actual release of the shutter with the arrangement disclosed in my above-noted patent, it is necessary to provide a degree of over-travel of the setting member relative to the master member, after the latter has reached its cocked position, which is not always practical to provide, or that it is necessary to make the spring 18 in my above noted patent so weak that it cannot be relied upon to move the setting member from its set position at the same rate each and every time the shutter is operated.

Added to the many types of flash lamps that are used in photography is a gaseous discharge lamp well known to those skilled in the art as the Edgerton lamp and available on the market under the trade name Kodatron lamp. This flash lamp, in addition to giving a very bright illumination of exceedingly short duration, has no noticeable "lag," but for synchronizing purposes is considered to flash the instant the circuit thereto is closed. The synchronizing problem with a lamp of this type is just the reverse of that with ordinary flash lamps, because the delay between the instant the shutter is tripped and the blades are fully opened, which can be referred to as the "lag" of the shutter, has to be accounted for rather than the lamp "lag." A synchronizing device in order to be universal must be such as to be capable of use with all types of flash lamps whether they have a "lag" or not.

Therefore, one object of the present invention is the provision of a flash synchronizing apparatus which is adapted for use with flash lamps having a "lag" and/or flash lamps having no "lag."

Another object is to provide a flash synchronizing apparatus which is built into a camera shutter and is, in fact, a part of the shutter operating mechanism.

A further object is the provision of a flash synchronizing device wherein the same member is adapted to successively close the lamp circuit and release the shutter, and includes means for positively retarding the movement of said member after the same has closed the lamp circuit and before releasing the shutter for the purpose of obtaining the desired delay to account for the "lag" of a flash lamp.

Another object is the provision of a device of the type set forth which includes a switch for the lamp circuit, and which switch is adjustable so as to obtain a range of different time delays necessary to cover the range of "lags" characteristic of all useful flash lamps having a "lag."

Another object is the provision of a device of the type set forth in which one of the switch contacts forms a part of the retarding means.

And yet another object is the provision of a device of the type set forth which includes two separate switches, one for use with flash lamps having a "lag" and the other for use with flash lamps having no "lag," and means for optionally rendering the first-mentioned switch inoperative.

And a further object is the provision of a flash synchronizing device of the type set forth which is built into a between-the-lens type of shutter so as to constitute a part thereof, and so that parts of the shutter mechanism constitute parts of the flash synchronizing device.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a top plan view of a photographic shutter and combined synchronizing device constructed in accordance with, and embodying, a preferred form of the invention. In this figure, the shutter is shown with the cover removed and the parts thereof in a set position.

Fig. 2 is a top plan view of the shutter shown in Fig. 1, and with the cover thereon and broken away to show the cooperation between the time delay control member and the adjustable switch for adapting the shutter to synchronize flash lamps having different "lag" characteristics, Fig. 3 is a sectional view taken substantially on line 3—3 of Fig. 1, Fig. 4 is a partial detail of Fig. 1, and showing the relative positions of the switch contacts and retarding means a short time after the release of the shutter trigger but before the setting member has moved far enough to release the shutter master member, and Fig. 5 is a partial detail of Fig. 1, and showing the shutter trigger moved to a position where it releases the shutter setting member and consequently trips the shutter.

Like reference characters refer to corresponding parts throughout the drawing.

It is well known in the art that the easiest and most satisfactory manner of securing accurate shutter and flash synchronization is to incorporate the switch contacts of a lamp circuit into the shutter operating mechanism so that the movement of the shutter mechanism itself will effect the closure of the lamp circuit in proper timed relation with the opening of the camera shutter. The present synchronizing device makes use of such an arrangement inasmuch as one switch contact is mounted in the path of movement of, and so as to be engaged by, the second contact moved by the shutter mechanism. The closure of the lamp circuit prior to release of the shutter to account for the "lag" in a lamp is accounted for by providing a lost-motion connection between the setting member and the shutter master member during which time the lamp circuit is closed prior to the setting member reaching the point where it releases the shutter master member. In order to accurately obtain the necessary delay between the closing of the lamp circuit and the release of the shutter mechanism, there is provided a retarding mechanism for the setting member which operates to retard the movement of the same between the instant it closes the lamp circuit and the instant it releases the shutter master member. So that this retarding means will not affect the actual operation of the blade opening and closing mechanism, and thereby affect the exposure time, it is so arranged that it is engaged by the shutter setting member prior to the release of the master member thereby. For the purpose of adjusting the time delay between the closing of the lamp circuit and the release of the shutter in accordance with lamps having different "lags," the switch contacts are so mounted that the displacement between the two can be varied; and means, including a calibrated scale visible on the face of the shutter, is provided for conveniently and accurately adjusting the switch contact in accordance with the characteristic "lag" of any lamp which it might be desired to use. This device is adapted for use with flash lamps having no "lag" by the provision of a second switch which is closed the instant the shutter blades reach their full open position; and means are provided for optionally rendering the first-mentioned switch inoperative when lamps having no "lag" are to be used.

Referring now to Fig. 1 of the drawing, the present invention constitutes a shutter of the setting type which may comprise a casing 10 in which a mechanism plate 11 is mounted and about which there is an upstanding flange 12. The flange 12 is provided with a cut-out notch 13 through which a trigger 14 may operate, and another elongated notch 15 through which the setting member 16 may extend.

The master member 17 may be pivoted at 18 and may be attached at 19 to a power spring 20, the opposite end of which is anchored to a pin 22 on the plate 11. The master member is provided with a short slot between the walls 23 and 24, the latter wall terminating in a shoulder 25. The setting member 16 includes an arcuate portion 26 located within the shutter casing 10 below the plate 11 and mounted in an arcuate slot, not shown, concentric with the flange 12 of the shutter casing so that the setting member can move between a set position, shown in full lines in Fig. 1, and an unset position, indicated by dotted lines in Fig. 1. When the setting member 16 is moved clockwise from its unset position to a set position the shutter setting pin 27 on the arcuate portion 26 engages the wall 24 of the master member and rotates the master member 17 clockwise to tension the power spring 20, and after which the setting pin 27 moves over the top of shoulder 25 permitting a relative movement between the setting member and the master member. Since the pin 27 moves in an arc, due to the arcuate portion 26 moving in a slot which is concentric to the shutter casing 10, the master member is held against movement in a counter-clockwise direction by said pin. Any sudden jar applied to the shutter will not release this connection because the power spring 20 is constantly holding the shoulder 25 against the pin 27. The mounting of the setting member 16 and its cooperation with the master member 17 to give the desired lost-motion connection between the two during setting and release of the shutter is completely set forth in U. S. Patents 2,176,844, and 2,256,354, both issued to me October 17, 1939, and September 16, 1941, respectively, and to which patents reference can be had for a more complete description of the shutter mechanism per se.

From an examination of Fig. 1, and as fully set forth in my above-noted patents, it will be apparent that the setting pin leaves the slot in the master member 17 prior to the time the setting member reaches its set position, as shown.

At the time said pin leaves the slot in the master member, said master member has been set, and although the setting member 16 and arcuate portion 26 and the pin 27 forming a part thereof can move further in a clockwise direction relative to the master member, the engagement of the pin 27 with the shoulder 25 holds said master member against movement under the action of the power spring 20. This lost-motion connection between the setting member and the master member forms one of the important features of the synchronizing device constituting the present invention as will be fully set forth hereinafter.

The setting member 16 is normally moved counter-clockwise, or to its position of rest, by an individual driving spring 29 connected at one end to the member and at the other end to a fixed anchor pin 30. The setting member is adapted to be releasably held in its set position, see Fig. 1, by a nose 31 on the trigger 14 which engages an upturned lug 32 on the left-hand end of the arcuate portion 26 of the setting member. The trigger 14 is normally biased in a clockwise direction by a light spring 33 encircling its pivot point 34 and having one end abutting the anchor pin 22 and the other the arm of the trigger. To release the shutter, the trigger 14 is moved counter-clockwise to the position shown in Fig. 5, and in which position the nose 31 of the trigger releases the lug 32 of the setting member and permits the latter to move counter-clockwise under the action of its driving spring 29. It is to be noted, however, that the shutter master member is not released until the setting member has moved relative to the master member until the setting pin 27 leaves the shoulder 25 and enters the slot in the master member. When the master member is released, it quickly rotates counterclockwise under the action of the power spring 20 to open and close the shutter. As in most shutters of this type, the master member carries a latch 35 pivoted to the master member at 36 and having the hook 37 engaging the upstanding pin 38 carried by the blade ring 39 which is pivoted to and operates the shutter leaves 40 in a known manner. The trigger 14 may also include an arm 41 having a flat surface 42 against which the cable of a well-known cable release, not shown, may engage to release the shutter when the cable release is mounted in a socket 43 provided in the flange 12, as is well known.

In accordance with the present invention, the arcuate portion 26 of the setting member is made substantially long to the right of the setting lever proper and is terminated by an upstanding lug 45 which extends upwardly through an arcuate slot 46 in the mechanism plate 11 which is long enough to permit the setting member to move over its entire range, e. g. from its unset position to a set position, as shown. This lug is adapted to operatively engage and close a normally opened switch in the lamp circuit when the setting member moves upon being released by the trigger and prior to the time said setting member has moved sufficiently far for the setting pin thereon to move off of the shoulder 25 on the master member and release the same. The setting member through the lug 45 is also adapted to engage a retarding means which retards the movement of the setting member between the time it closes the switch and releases the shutter master member to obtain a delay between the two occurrences in accordance with the "lag" of any flash lamp which might be connected into a lamp circuit controlled by said switch.

Referring now to Figs. 1, 3 and 4, the switch for the lamp circuit includes a composite pivoted switch contact, indicated generally at 47, and which may comprise an arm 48 of insulating material fixed to a sleeve 49 rotatably mounted on a stud 50 fixed to the mechanism plate 11. Mounted in the other end of the arm 48 is a metal pin 51 having a binding post 52 connected thereto. Fixed to the sleeve 49 in overlying relation with the arm 48 is a metal control arm 53 which includes two turned-down lugs 54 embracing the edges of the arm 48 to prevent relative transverse movement of the two. The control arm 53 includes a turned-down tail 55 which one end of a spring 56, encircling the sleeve 49, engages to normally move the composite switch contact in a counter-clockwise direction about the stud. The metal pin 51 is adapted to be electrically connected to a jack 57 by an insulated flexible wire 58 connected to binding post 52, and which jack extends radially from the flange 12 of the shutter casing and is insulated from the flange by an insulating washer 59.

The second contact of the switch comprises a lever 60 pivotally mounted on a stud 61 fixed to the mechanism plate 11 and including a nose portion 62 which is adapted to engage the metal contact pin 51 to close the lamp circuit. This will be clearly understood when it is pointed out that the second jack 63 extending from the shutter casing, onto which a plug connected to a circuit including a flash lamp L and a source of potential B is adapted to be slid, is grounded to the shutter casing and thereby electrically connected to the lever 60. Pivoted at 64 to the lever 60 is a latch 65 for operatively connecting the setting member to the second contact to cause movement of the setting member from its set position to pivot the lever 60 counter-clockwise until the nose portion 62 engages the metal contact 51 to close the switch, and to permit the setting member to move toward its set position without moving the lever 60 to a switch closing position. This latch 65 includes an extending portion 66 which normally lies in the path of the upturned lug 45 on the arcuate portion 26 of the setting member and a down-turned lug 67 which engages the edge of the lever 60 which prevents relative movement between the latch and lever when the former is moved counter-clockwise, but permits relative movement of the two when the latch is moved clockwise. One arm 68 of a spring 69 coiled around the stud 61 overhangs both the latch 65 and lever 60, see Figs. 1 and 3, so that it acts to normally move the nose portion 62 of the second contact from the contact pin 51 to open the switch and at the same time normally hold the lug 67 of the latch 65 against the edge of the lever 60. Inasmuch as the parts assume the position shown in Fig. 1 when the shutter is set, it will be readily understood that when the trigger 14 is operated to release the setting member the latter starts to move in a counter-clockwise direction under the action of driving spring 29. As soon as the setting member starts to so move, the upstanding lug 45 engages the extending portion 66 of the latch 65 and causes the lever 60 to be rotated counter-clockwise about its pivot until the nose portion 62 contacts the pin 51 and closes the circuit. This all happens before the setting member has moved far enough for the setting pin 27 to move off of the shoulder 25 and release the master member. It will be observed that as the setting member pivots the lever 60 counter-clockwise the latch 65, being pivoted thereto, is moved with the lever and away from the lug 45. The parts are so arranged that the latch 65 is moved from the path of the lug 45 the instant, or just prior to the instant, the setting member releases the master member so that there is no drag whatsoever on the shutter mechanism after it starts to open and close the shutter blades.

I have found that it is commercially impractical to rely on the lost-motion between the setting member and master member alone to obtain the maximum delay which might be required to insure synchronization. Therefore, to obtain this delay I retard the movement of the setting member between the time it closes the lamp switch and the instant it releases the master member. To this end I use a gear-train retard which includes a gear segment 70 forming one end of lever 60 and which meshes with a pinion 71 fixed to a flywheel 72 rotatably mounted on the mechanism plate 11, see Figs. 1 and 3. When the lever 60 is pivoted counter-clockwise by movement of the setting member from its set position, the gear segment must drive the flywheel and this retards the movement of the setting member to its unset position, or between the time it closes the switch and the time it releases the master member. While it is obvious that the retarding gear-train could include more gears than I have shown if desired, I have found that the limited train I have shown is sufficient to obtain the maximum "lag" required by any lamp on the market at the present time. In this connection, it must be remembered that in the arrangement shown the springs 56 and 69 must be overcome by the setting member in moving from its set position, so that these springs supplement the retarding gear train and reduce the required size of the same.

Inasmuch as all flash lamps do not have the same "lag," but this characteristic varies in different lamps over a wide range, e. g. 0–20 milliseconds, it is imperative that means be provided for varying the time delay between the instant the switch is closed until the master member is actually released in order that the device may be useful with all lamps on the market. To this end I have provided an upstanding finger 75 on the control arm 53 of the first contact which is adapted to extend through a short arcuate slot 74 in a plate 73 which is mounted on the flange 12 in spaced relation with the mechanism plate 11 and covering the parts mounted thereon, as shown in Figs. 1 and 3. Rotatably mounted on the shutter casing 10 in encircling relation to the lens barrel 76 is a control ring 77 including a peripheral cam 78 against which the finger 75 is normally held by the spring 56. As the control ring 77 is rotated over a given range the cam 78 moves the composite switch arm 47 and contact pin 51 thereon from the normal position of the nose portion 62 of the second contact, or permits it to move towards said nose portion, and thereby adjust the time at which the switch is closed with relation to the time the master member is released, both by the master member.

The less the distance between the two contacts in a normal position, the sooner they will be brought into engagement when the setting member starts to move from its set position and, therefore, the longer will be the delay between the closing of the lamp switch and the actual release of the shutter blade operating mechanism. On the other hand, if the contacts are separated by a substantial distance in their normal positions, the farther the setting member will have to move before bringing them into engagement to close the circuit, and the shorter will be the delay before the setting member actually releases the master member.

It will be readily observed that adjusting the contacts to and from one another in the present instance is in effect the same as altering the effectiveness of the retarding means, because changing the normal spacing of the switch contacts results in changing the amount of the retarding means which is effective after the switch is closed, and, after all, this is the only portion of the retarding means which is used in synchronizing the flash of the lamp with the opening of the shutter. Putting it in another way, if the contacts are spaced apart so that one-third of the gear retard is spent before the contacts are actually brought into engagement, only two-thirds of the retard is effective so far as the delay between the closing of the switch and actually releasing the shutter is concerned.

To facilitate an accurate adjustment of the control ring 77 in accordance with lamps having different "lags," the ring is provided with an arm 79 which extends radially of the shutter casing and terminates in the pointer 80 which overhangs the cover plate 81 of the shutter casing and cooperates with a scale 82 on the face of said cover marked off in millisecond "lags" covering the range encountered by all flash lamps which it might be desired to use. It goes without saying that the scale 82 is calibrated in accordance with the cam 78 so that the switch contacts will be properly adjusted to give the "lags" indicated by the scale.

As pointed out above, it is becoming more and more common to use gas discharge flash lamps which flash instantly upon closure of their circuits and which have no "lag," practically speaking. Inasmuch as flash lamps of this kind have no "lag," the "lag" of the shutter, although small, must be accounted for, and the only way in which such a lamp can be synchronized with a shutter is to have the lamp switch closed at the instant the shutter blades reach their full open position. In order to adapt the present synchronizing device for using flash lamps of this type, as well as flash lamps having "lags," I have provided a third contact 83 which is mounted on, but insulated from, the mechanism plate in a position to be engaged by an upstanding lug 84 on the blade ring 39 the instant the shutter leaves are fully open. This lug 84 extends through an arcuate slot 85 in the mechanism plate, and which slot is long enough to permit the blade ring to oscillate over a given path during the opening and closing movement of the shutter blades. The third contact is so located that the lug 84 abuts the same when the blades are fully open and just before it starts to move in the opposite direction for closing the blades. To insure a satisfactory contact, this third contact is made flexible so that it can be engaged and flexed by the very last part of the movement of the lug 84 in a clockwise direction, care being taken that it does not retard the normal movement of the blade ring in so doing. The third contact may be connected to the jack 57 by a flexible continuation 86 of the wire 58, as shown, or it may be connected directly to the jack, or connected to a third jack provided for use with this type of flash lamp in combination with jack 63. The lug 84 constitutes a switch contact because it is a metal part of the shutter to which the jack 63 is grounded.

The engagement of lug 84 with third contact 83 does not affect in any way the normal operation of the device when using lamps having "lags" because the two never come in contact until after the contacts 61 and 62 when using lamps having "lags" and the lamp circuit is dead. On the other hand, if when using flash lamps having no "lag" then contacts 61 and 62 must be prevented from coming into engagement, otherwise, the lamp will be flashed prematurely. To this end, I have provided the cam 78 on the control ring 77 with a high point 87 which will move the contact pin 61 sufficiently far from the contact 62 so that the two will not be brought into engagement. This high point 87 is so located that when the pointer 80 is moved to zero on the scale 82 it will engage the finger 76 and move the composite switch arm 47 clockwise until the contact pin 61 thereon is displaced from the contact 62 to a point where the two will not come into engagement, thus rendering the first switch wholly inoperative.

From the above description it will be readily appreciated that the present synchronizing device is such as to be essentially a part of the shutter itself, thereby giving a neat appearance and a contact arrangement easily adapted to any shutter of the setting type. The switch contacts and the lamp circuit are combined with the shutter mechanism so that the closing of the lamp circuit is dependent upon the release of the shutter, as is recognized to be the best suited arrangement for accurate synchronization; but such contacts are combined with the shutter mechanism in such a way that their engagement does not in any way tend to restrain the movement of the shutter operating mechanism proper, whereby the shutter will operate as well as any other shutter of this type not adapted for synchronization. The device is not only adapted for use with a variety of flash lamps having different "lag" characteristics, but is also adapted for use with flash lamps which have no "lag" characteristics. In addition, the present synchronizing device includes means for accurately and conveniently adjusting the same for use with different flash lamps having "lag" characteristics encompassing a considerable range, whereby the device can be quickly and directly adjusted for synchronization with any lamp by simply knowing the "lag" characteristics of the lamp to be used and which information is furnished with all well-known flash lamps obtainable on the market.

Although I have shown and described certain specific embodiments of my invention, I am fully aware that many modifications thereof are possible. My invention, therefore, is not to be restricted except insofar as is necessitated by the scope of the appended claims.

Having thus described my invention, what I claim as new and desire to secure by Letters Patent of the United States is:

1. In a photographic shutter having an associated flash synchronizing device the combination with a master member, means for setting and holding the master member in a set position comprising a setting member having a normal position of rest and movable therefrom for setting the shutter, a lost-motion connection between the setting member and the master member permitting said setting member to move idly with respect to said master after said master member has been set, a releasable latch mechanism for holding said setting member and master member in a set position, of a flash lamp igniting mechanism comprising a lamp circuit, a normally open switch in said circuit arranged to be closed by movement of said setting member from its set position and while the setting member is moving idly relative to said master member, and means actuated by said setting member for retarding the movement thereof after the same has closed said circuit and before it releases said master member to cause a delay between the closing of the lamp circuit and the opening of the shutter in accordance with the "lag" of a given flash lamp.

2. A photographic shutter according to claim 1, in which the switch comprises two normally separated contacts one of which is adapted to be moved into engagement with the other by the setting member when moving from a set position, and means for adjusting the two contacts relative to one another to account for the "lags" of different types of flash lamps.

3. A photographic shutter according to claim 1, in which the switch comprises two movable contacts which are normally separated, one of said contacts adapted to be moved into engagement with the other by the setting member when moving from a set position and thereafter being moved with said first contact by said setting member, and means for disconnecting said switch mechanism from said setting member prior to the release of said master by said setting member.

4. A photographic shutter according to claim 1, in which the means for retarding the movement of the setting member from its set position is a gear train, means on said setting member for engaging and moving said gear train as the setting member moves from its set position, and means for disconnecting said setting member from said gear train prior to releasing the master member.

5. A photographic shutter according to claim 1, in which the switch comprises two normally separated contacts, and one of which contacts constitutes a part of the retarding means for the setting member.

6. A photographic shutter according to claim 1, in which the switch comprises two movable contacts which are normally separated, one of said contacts adapted to be moved into engagement with the other by the setting member when moving from a set position, the retarding means for the setting member comprising a gear train adapted to be engaged and driven by said setting member, and one of said switch contacts constituting an element of said gear train.

7. A photographic shutter according to claim 1, in which the switch and retarding means for the shutter are so arranged that neither one is operated by the setting member when moving to a set position.

8. A photographic shutter according to claim 1, in which the switch constitutes a part of the retarding means for the setting member.

9. In a photographic shutter having an associated flash synchronizing device the combination with a master member, means for setting and holding the master member in a set position comprising a setting member having a normal position of rest and movable therefrom for setting the shutter, a lost-motion connection between the setting member and the master member permitting said setting member to move idly with respect to said master member after said master member has been set, a releasable latch mechanism for holding said setting member and master member in a set position, of a flash lamp igniting mechanism comprising a lamp circuit, a normally open switch in said circuit including a first adjustable contact connected to one side of said circuit, a second contact mounted to move to and from said first contact to close the circuit and normally separated therefrom, means for operatively connecting said second contact to said setting member when the latter moves from a set position whereby said contact is moved into engagement with said first contact to close the circuit means for retarding the movement of said setting member from its set position after the same has closed said circuit and before the master member is released to account for the "lag" in flash lamps, and means for adjusting said first contact to and from the second contact to vary the time interval between the closing of the lamp circuit and release of the shutter in accordance with different types of flash lamps, said last mentioned means including an adjustable cam movably mounted on said shutter and operatively connected to said first contact to move the same to and from the second contact when adjusted, and said cam including an arm movable over a scale on said shutter calibrated in terms of different lamp "lags."

10. In a photographic shutter having an associated flash synchronizing device the combination with a master member, means for setting and holding the master member in a set position comprising a setting member having a normal position of rest and movable therefrom for setting the shutter, a lost-motion connection between the setting member and the master member permitting said setting member to move idly with respect to said master member after said master member has been set, a releasable latch mechanism for holding said setting member and master member in a set position, of a flash lamp igniting mechanism including two normally open switches for closing the same or different lamp circuits; one switch, adapted for use in a circuit including a lamp having a "lag," including two movable contacts which are normally separated, one of said contacts adapted to be moved into engagement with the other by the setting member when moving from a set position and prior to release of the master member thereby, the other switch adapted for use in a circuit including a lamp having no "lag," and including a third contact carried by a part of the shutter blade operating mechanism to move over a given path as the shutter opens and closes, and a fourth contact arranged to be engaged by said third contact at the instant the shutter is wide open, and means on said shutter for selectively preventing closure of said first switch when a flash lamp having no "lag" is being used.

11. A photographic shutter according to claim 10, in which the means for selectively preventing closure of said first switch includes a manually adjustable member accessible from the exterior of the shutter for moving said first contact to a position in which it can not be engaged by said second contact.

WILLIAM A. RIDDELL.